(12) United States Patent
Tsai et al.

(10) Patent No.: US 7,495,713 B2
(45) Date of Patent: Feb. 24, 2009

(54) TOUCH PANEL

(75) Inventors: Cheng-Yeh Tsai, Taipei County (TW); Wei-Chou Chen, Hsinchu (TW)

(73) Assignee: Hannstar Display Corp., Tao-Yuan Hsien (TW)

( * ) Notice: Subject to any disclaimer, the term of this patent is extended or adjusted under 35 U.S.C. 154(b) by 451 days.

(21) Appl. No.: 11/462,788

(22) Filed: Aug. 7, 2006

(65) Prior Publication Data

US 2008/0030633 A1 Feb. 7, 2008

(51) Int. Cl.
*G02F 1/1335* (2006.01)
(52) U.S. Cl. ................. 349/12; 349/2; 349/42
(58) Field of Classification Search ........... 349/62, 349/69
See application file for complete search history.

(56) References Cited

U.S. PATENT DOCUMENTS 7,418,117 B2 * 8/2008 Kim et al. ............ 382/124

* cited by examiner

*Primary Examiner*—David Nelms
*Assistant Examiner*—Phu Vu
(74) *Attorney, Agent, or Firm*—Thomas, Kayden, Horstemeyer & Risley

(57) ABSTRACT

A touch panel is provided. The touch panel comprises a first substrate and a second substrate facing the first substrate. A black matrix is formed on the first substrate defining a plurality of sub-pixel areas, a plurality of color filters on the sub-pixel areas. A photosensitive sensitive element is formed on the second substrate. The color filters comprise a red color filter, a green color filter, a blue color filter and a white color filter over the photosensitive element.

22 Claims, 6 Drawing Sheets

TOUCH PANEL

BACKGROUND OF THE INVENTION

1. Field of the Invention

The invention relates to a touch panel, and in particular to light sensitive touch panel having improved photosensitivity.

2. Description of the Related Art

Touch panels generally include a liquid crystal panel (LCD) with an additional sensitive film thereon. The additional sensitive film may increase cost and reduce the transmittance of the LCD about by 20%. Light sensitive touch panels include a photosensitive thin film transistor with photosensitive amorphous channel and a display element of LCD integrated and manufactured thus lowering cost and improving optical properties.

FIG. 1 is a circuit diagram of a conventional light sensitive touch panel. The light sensitive touch panel 10 comprises a first substrate (not shown) and a second substrate (not shown). A black matrix on the first substrate defining a plurality of sub-pixel areas (not shown); a plurality of color filter patterns on the sub-pixel areas (not shown). A plurality of horizontal scan lines 16 and a plurality of perpendicular data lines 18 are disposed on the second substrate. Each sub-pixel includes a pixel thin film transistor 20 having a gate electrically connected to one of the scan lines 16, a source electrically connected to one of the data lines 18 and a drain electrically connected to a pixel electrode (not shown). FIG. 2 is a schematic diagram showing the sub-pixels of the conventional light sensitive touch panel. A red color filter 24, a green color filter 26 and a blue color filter 28 corresponding to the respective pixel electrodes 22 are formed on the upper substrate 12 to respectively display red light, green light and blue light. The pixel electrodes 22 are formed on the lower substrate 14. Additionally, a black matrix 30 is formed among the red color filter 24, the green color filter 26 and the blue color filter 28 to shield the pixel thin film transistor (not shown) and prevent light leakage from adjacent sub-pixels, thereby obtaining high contrast.

The Human eye has relatively low sensitivity to blue light, thus a photosensitive element comprising a photosensitive thin film transistor and a readout thin film transistor must be located under the blue color filter. As shown in FIG. 1, a photosensitive thin film transistor 32 comprises a gate electrode and a source electrode both electrically connected to a horizontal common line 34 and a drain electrode electrically connected to the readout thin film transistor 36. The readout thin film transistor 36 comprises a gate electrode electrically connected to one of the scan lines 16, a source electrically connected to a perpendicular readout line 38 and a drain electrically connected to the photosensitive thin film transistor 32. Under the blue color filter, the gates of the pixel thin film transistor 20 and the readout thin film transistor 36 are respectively connected to the adjacent scan lines 16 surrounding the blue sub-pixel. When the photosensitive thin film transistor 32 is radiated by an ambient light, a photo current is produced. On the other hand, when the photosensitive thin film transistor 32 is shielded by a touch object, the photo current is not produced. The readout thin film transistor 36 reads out and periodically transfers the photo current to a processor (not shown) by a readout line 38. The touched position can be detected by the processor according to photo current change when light sensitive touch panel 10 is touched by a touch object. Thus, the touch control function of the touch panel can be performed.

The photosensitive element is arranged under the blue color filter of the conventional light sensitive touch panel, the photosensitive thin film transistor is therefore radiated by the ambient light after passing through the blue color filter. The ambient light is partially absorbed by the blue color filter thus reducing the photosensitivity of the photosensitive element.

BRIEF SUMMARY OF THE INVENTION

Therefore, there is a need to provide a touch panel such as a light sensitive touch panel with improved photosensitivity. The touch panel includes a photosensitive element arranged under the white color filter to allow the ambient light to directly radiate from the photosensitive thin film transistor.

An exemplary embodiment of a touch panel comprises a first substrate, a second substrate. A black matrix on the first substrate defining a plurality of sub-pixel areas; a plurality of color filters on the sub-pixel areas, wherein said color filters comprise a red color filter, a green color filter, a blue color filter and a white color filter. A plurality of scan lines and a plurality of data lines vertically and horizontally arranged on the second substrate. Each sub-pixel comprises a pixel thin film transistor having a gate electrode electrically connected to one of the scan lines, a source electrically connected to one of the data lines and a drain electrode electrically connected to a pixel electrode. At least one photosensitive element is formed in the sub-pixel regions. Moreover, the white color filter is over the photosensitive element.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In order to increase resolution and brightness, liquid crystal displays having four color filters (red, green, blue and white) have been developed to replace the conventional touch panel having only three color filters (red, green, blue). The white color filter without color pigments, dye or colorants can directly display a white light from a backlight source. In some embodiments of the invention, a photosensitive element is integrated and manufactured under the white color filter of the liquid crystal display of the touch panel thereby improving photosensitivity of the photosensitive element.

Figure 1:
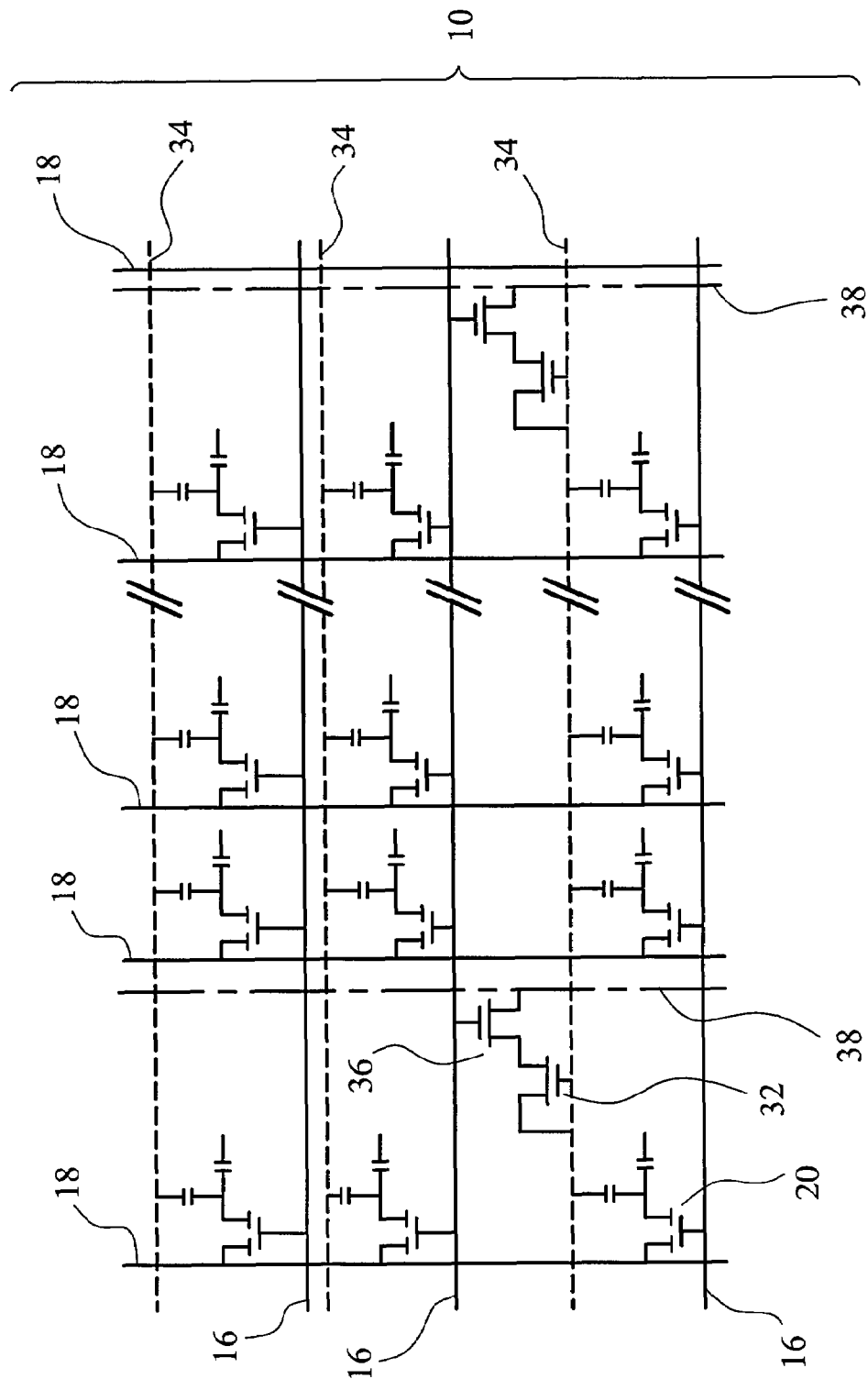
FIG. 1 is a circuit diagram of a conventional touch panel.
Figure 2:
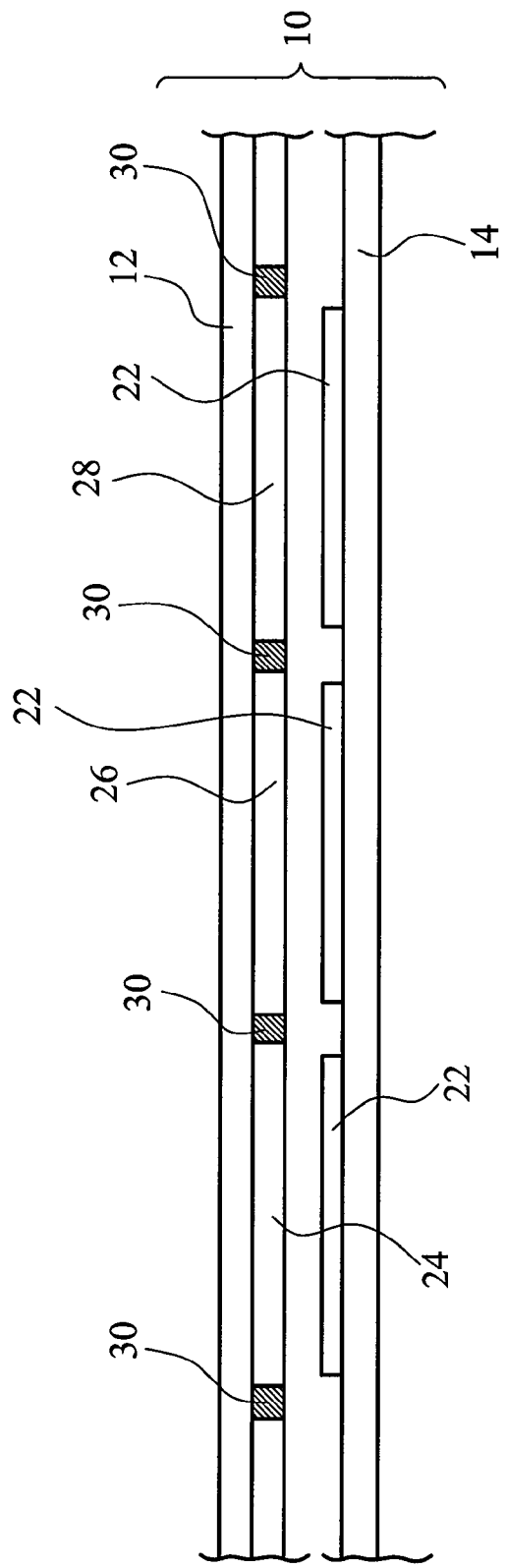
FIG. 2 is a schematic diagram showing a sub-pixel of the conventional touch panel.
Figure 3:
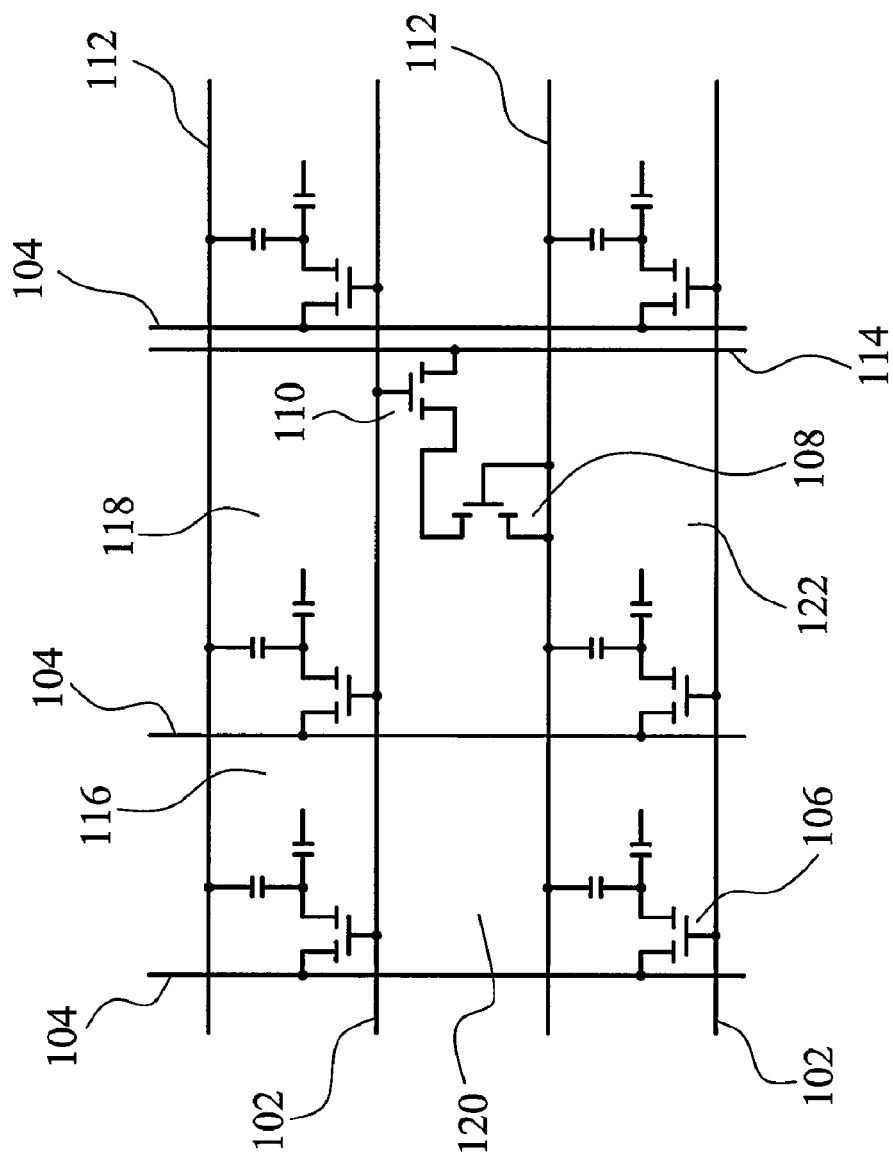
FIG. 3 is a circuit diagram of an exemplary touch panel of the invention.

As shown in FIG. 3, a plurality of horizontal scan lines 102 and a plurality of vertical data lines 104 are disposed on the second substrate (not shown). Color filters are regularly arranged in red sub-pixel 116, green sub-pixel 118, blue sub-pixel 120 and white sub-pixel 122. A red color filter, a green color filter and a blue color filter respectively corresponding to red sub-pixel 116, green sub-pixel 118, and blue sub-pixel 120 are disposed on the first substrate (not shown). There is a no colored layer (no pigments or dye or colorants) corresponding to the white sub-pixel 122. The white sub-pixel 122 may comprises a transparent organic resin layer.

The red sub-pixel 116, the green sub-pixel 118, the blue sub-pixel 120, and the white sub-pixel 122, serving as display elements, respectively comprise a pixel thin film transistor 106. The pixel thin film transistor 106 has a gate electrode electrically connected to one of the scan lines 102, a source electrode electrically connected to one of the data lines 104 and a drain electrode electrically connected to a pixel electrode (not shown). The white color filter in the white sub-pixel 122 is over the photosensitive element comprising a photosensitive thin film transistor 108 and a readout thin film transistor 110. The photosensitive thin film transistor 108 may comprise a gate electrode and a source electrode both electrically connected to a common line 112 and a drain electrically connected to the readout thin film transistor 110. The readout thin film transistor 110 may comprise a gate electrode electrically connected to one of the scan lines 102, a source electrode electrically connected to a vertical readout line 114 and a drain electrode electrically connected to the photosensitive thin film transistor 108. In the white sub-pixel 122, the gate electrodes of the pixel thin film transistor 106 and the readout thin film transistor 110 are respectively connected to the adjacent scan lines 102 surrounding the sub-pixel region which is covered by the white color filter of the white sub-pixel 122.

Figure 4:
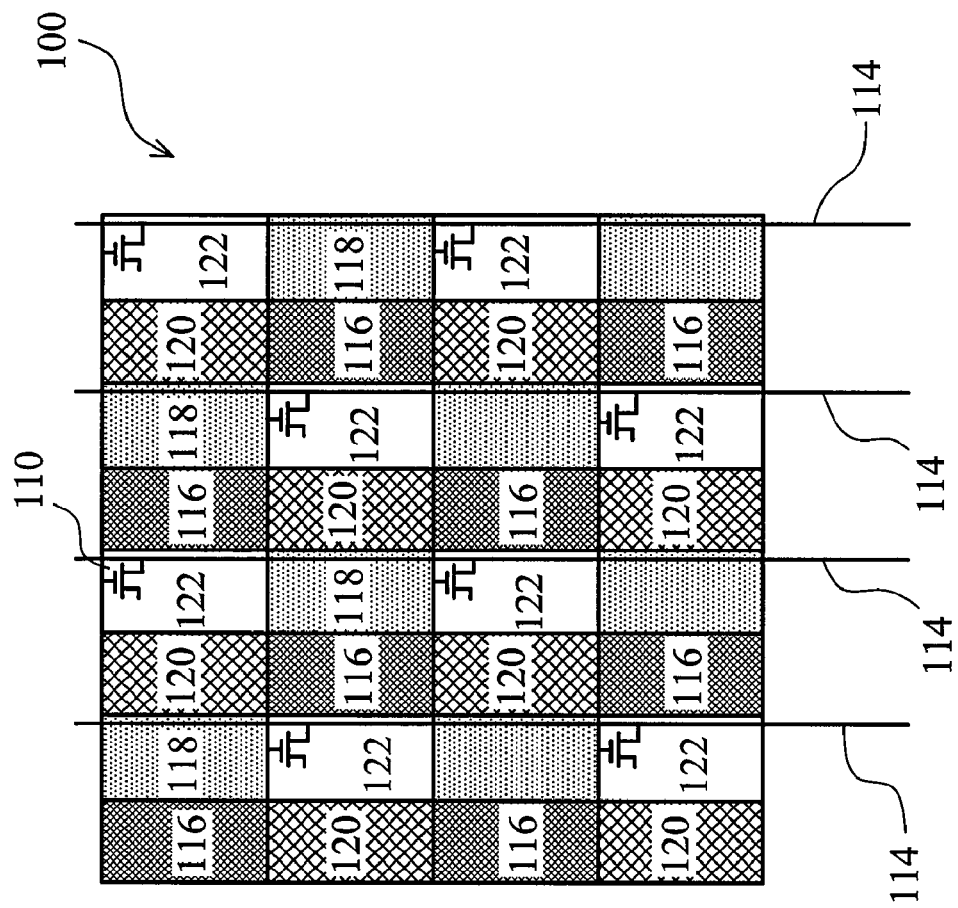
FIG. 4 is a schematic diagram of a touch panel of a first embodiment of the invention.
Figure 5:
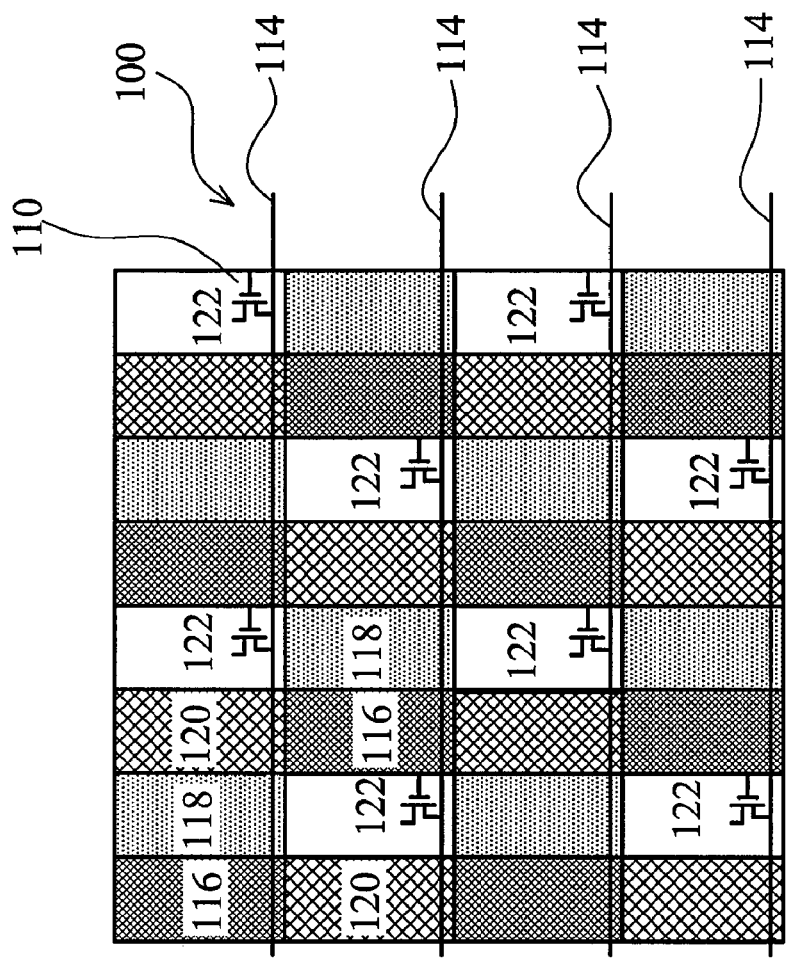
FIG. 5 is a schematic diagram of a touch panel of a second embodiment of the invention.

FIG. 4 and FIG. 5 are schematic diagrams of the touch panels of the first and second embodiments of the invention. As shown in FIG. 4, red sub-pixel 116, green sub-pixel 118, blue sub-pixel 120 and white sub-pixel 122 are regularly arranged in the touch panel 100 of a first embodiment. A photosensitive element comprising a photosensitive thin film transistor (not shown) and a readout thin film transistor 110 is formed under the white color filter of the white sub-pixel 122. The readout line 114 arranged along the vertical direction is connected to the readout thin film transistor 110. Similarly, as shown in FIG. 5, red sub-pixel 116, green sub-pixel 118, blue sub-pixel 120 and white sub-pixel 122 are regularly arranged in the touch panel 100 of a second embodiment. A photosensitive element comprising a photosensitive thin film transistor (not shown) and a readout thin film transistor 110 is formed under the white color filter of the white sub-pixel 122. The readout line 114 arranged along the horizontal direction is connected to the readout thin film transistor 110.

Figure 6:
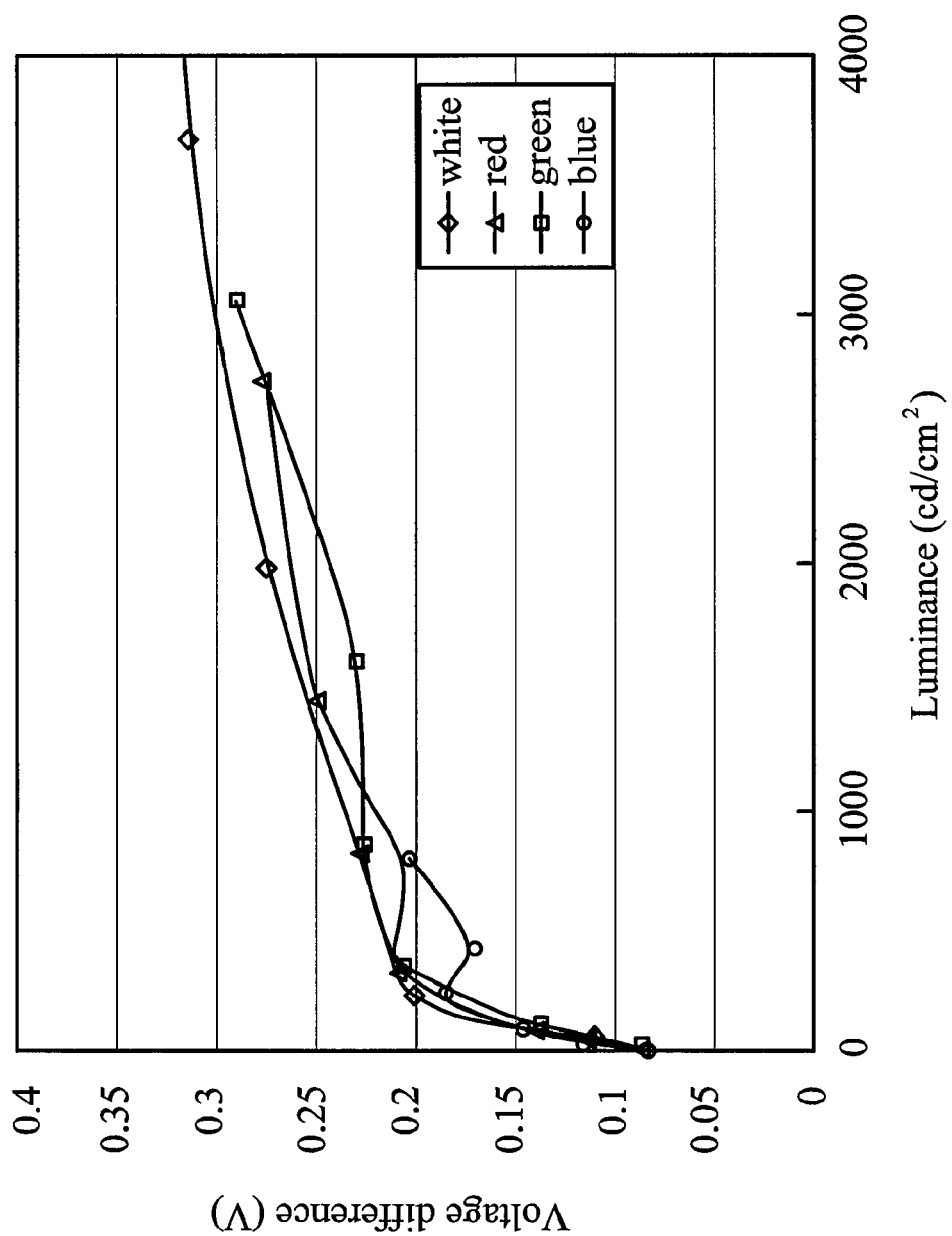
FIG. 6 is schematic diagram showing curves of voltage difference versus luminance of red light, green light, blue light and white light respectively.

FIG. 6 is schematic diagram showing curves of voltage difference versus luminance of red light, green light, blue light and white light respectively. A photosensitive thin film transistor 108 is respectively radiated by different luminance of red, green, blue and white light. The voltage difference is a voltage drop of a photo current through a fixed resistor. Thus, the greater the measured voltage difference, the greater produced photo current. Among the range of 1 to 1000 cd/cm² of the ambient light, white light and green light can produce a greater voltage difference. If the photosensitive thin film transistor 108 is disposed under the green color filter (green sub-pixel 118), the image color of the light sensitive touch panel may be changed. On the other hand, the white color filter (white sub-pixel 122) is over a photosensitive thin film transistor 108 and a pixel thin film transistor, wherein the pixel thin film transistor is not completely turned on while displaying a color image. Therefore, the image color of the light sensitive touch panel may not be changed.

As compared with the poor photosensitivity of conventional touch panels, the photosensitive thin film transistor of the photosensitive element formed under the white color filter can be directly radiated by the ambient light without passing through a colored layer. Thus, greater photo current can be produced and photosensitivity of the touch panel can be improved.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch panel, comprising:
a first substrate;
a black matrix on the first substrate defining a plurality of sub-pixel areas;
a plurality of color filters on the sub-pixel areas;
a second substrate facing the first substrate; and
a photosensitive element on the second substrate,
wherein the color filters comprise a white color filter over the photosensitive element.

2. The touch panel as claimed in claim 1, wherein the color filters comprises: a red, a green, a blue and the white color filters.

3. The touch panel as claimed in claim 1, further comprising a liquid crystal layer disposed between the first substrate and the second substrate.

4. The touch panel as claimed in claim 1, wherein the photosensitive element comprises a photosensitive thin film transistor and a readout thin film transistor.

5. The touch panel as claimed in claim 4, wherein the photosensitive thin film transistor comprises a gate electrode and a source electrode both electrically connected to a common line and a drain electrode electrically connected to the readout thin film transistor.

6. The touch panel as claimed in claim 4, wherein the readout thin film transistor comprises a gate electrode electrically connected to a scan line, a source electrode electrically connected to a readout line and a drain electrode electrically connected to the photosensitive thin film transistor.

7. The touch panel as claimed in claim 6, wherein the readout line is parallel to the data lines and perpendicular to the scan lines.

8. The touch panel as claimed in claim 6, wherein the readout line is parallel to the scan lines and perpendicular to the data lines.

9. The touch panel as claimed in claim 6, wherein the photosensitive thin film transistor senses an ambient light and converts to output current.

10. The touch panel as claimed in claim 9, wherein the readout thin film transistor response to the output current and output an readout current to a signal processor via the readout line.

11. A touch panel, comprising:
a first substrate;
a black matrix on the first substrate defining a plurality of sub-pixel areas;
a plurality of color filters on the sub-pixel areas;
a transparent layer on the sub-pixel areas;
a second substrate facing the first substrate; and
a photosensitive element on the second substrate,
wherein the transparent layer is over the photosensitive element.

12. The touch panel as claimed in claim 11, wherein the color filters comprise a red, a green and a blue color filters.

13. The touch panel as claimed in claim 11, wherein the transparent layer is a no colored layer.

14. The touch panel as claimed in claim 11, wherein the transparent layer is made of a transparent organic resin.

15. The touch panel as claimed in claim 11, further comprising a liquid crystal layer disposed between the first substrate and the second substrate.

16. The touch panel as claimed in claim 11, wherein the photosensitive element comprises a photosensitive thin film transistor and a readout thin film transistor.

17. The touch panel as claimed in claim 16, wherein the photosensitive thin film transistor comprises a gate electrode and a source electrode both electrically connected to a common line and a drain electrode electrically connected to the readout thin film transistor.

18. The touch panel as claimed in claim 16, wherein the readout thin film transistor comprises a gate electrode electrically connected to a scan line, a source electrode electrically connected to a readout line and a drain electrode electrically connected to the photosensitive thin film transistor.

19. The touch panel as claimed in claim 18, wherein the readout line is parallel to the data lines and perpendicular to the scan lines.

20. The touch panel as claimed in claim 18, wherein the readout line is parallel to the scan lines and perpendicular to the data lines.

21. The touch panel as claimed in claim 16, wherein the photosensitive thin film transistor senses an ambient light and converts to an output current.

22. The touch panel as claimed in claim 21, wherein the readout thin film transistor responses to the output current and output an readout current to a signal processor via the readout line.

* * * * *